(12) United States Patent
Soo et al.

(10) Patent No.: US 6,903,749 B2
(45) Date of Patent: Jun. 7, 2005

(54) SYSTEM AND METHOD FOR IMAGE SCALING INTERPOLATION

(75) Inventors: David Soo, Fremont, CA (US); Meng Long, Milpitas, CA (US)

(73) Assignee: Chrontel, Inc., San Jose, CA (US)

( * ) Notice: Subject to any disclaimer, the term of this patent is extended or adjusted under 35 U.S.C. 154(b) by 386 days.

(21) Appl. No.: 10/288,745

(22) Filed: Nov. 5, 2002

(65) Prior Publication Data

US 2003/0085912 A1 May 8, 2003

Related U.S. Application Data

(60) Provisional application No. 60/332,912, filed on Nov. 5, 2001.

(51) Int. Cl.$^7$ ................................................ G09G 5/02
(52) U.S. Cl. ...................... 345/605; 345/606; 345/609; 345/619; 345/698; 382/299; 382/300
(58) Field of Search ................................ 345/605, 606, 345/609

(56) References Cited

U.S. PATENT DOCUMENTS

| | | | | |
|---|---|---|---|---|
| 6,204,855 B1 | * | 3/2001 | Khaund | 345/589 |
| 6,587,117 B1 | * | 7/2003 | Wright et al. | 345/601 |
| 6,664,973 B1 | * | 12/2003 | Iwamoto et al. | 345/589 |
| 6,812,935 B1 | * | 11/2004 | Joe et al. | 345/660 |

* cited by examiner

*Primary Examiner*—Matthew C. Bella
*Assistant Examiner*—Antonio Caschera
(74) *Attorney, Agent, or Firm*—Dorsey & Whitney

(57) ABSTRACT

A sub-system and method to receive input image pixel amplitude data at an input pixel resolution and to output image pixel amplitude data in one or two dimensions at a higher pixel resolution includes a computer system-executable algorithm with user-programmable coefficients. The programmable coefficients are user-selectable according to the nature and quality of the input image data such that sharpness of the output image data can be at least partially tailored to the image.

20 Claims, 6 Drawing Sheets

SYSTEM AND METHOD FOR IMAGE SCALING INTERPOLATION

CLAIM TO PRIORITY

Priority is claimed to co-pending U.S. provisional patent application Ser. No. 60/332,912 filed by applicants herein on 5, Nov. 2001, entitled "System and Method for Imaging Scaling Interpolation".

FIELD OF THE INVENTION

The invention relates generally to scaling of video images and more particularly to scaling from a lower video resolution to a higher video resolution.

BACKGROUND OF THE INVENTION

Many applications including graphics and video displays require that graphic data be scaled from lower resolution modes to a higher resolution mode. For example, the lower resolution mode may be dictated by a graphics controller, perhaps a VGA resolution controller. The higher resolution may be the native resolution of supported video display devices, for example SVGA, XGA, SXGA, SXGA+, UXGA.

In addition, many computer users desire to display video within a display window. Fitting the video to be displayed within the window can require scaling the video source up or down. A simple form of up-scaling is to duplicate pixels in the video image, for example sampling and duplicating m out of every n pixels. However this somewhat simplistic approach of pixel duplication can introduce undesirable visual artifacts, and is not widely used.

Linear interpolation is used in the prior art to improve somewhat the quality of scaled video images. Using so-called bilinear interpolation, when an output sample (e.g., pixel location) falls between two input samples (horizontally or (vertically), the output sample is computed by linearly interpolating between the two samples. Bilinear interpolation operates by calculating the distance-weighted average of the four neighboring pixels linearly, relative to the output pixel location:

$$PO=(1-dy)\cdot[(1-dx)\cdot P+dx\cdot PH]+dy\cdot[(1-dx)\cdot PV+dx\cdot PHV]$$

where PO is the amplitude of the output pixel, where P, PH, PV, PHV are the amplitudes of the four neighboring pixels of PO, and where distances from P to PH, from P to PV, from PH to PHV, from PV to PHV are normalized to one. The normalized distances from P to PO are shown as dx, dy in FIG. 1.

But even bilinear interpolation can cause undesirable visual artifacts, depending on the content of the displayed image. For example, graphics images containing text should have sharper edges than images of moving pictures. Nonetheless, bilinear interpolation applies equal edge enhancement to all images regardless of content. Thus, while bilinear interpolation may improve the display quality of up-scaled video images, less improvement may be apparent for images containing text.

Thus there is a need for a method and system to enhance quality of upscaled images, including text images.

The present invention provides such a method and system for implementing the method.

SUMMARY OF THE INVENTION

The present invention upscales images using an algorithm that can interpolate pixel positions using programmable coefficients that can accommodate different types of images requiring different degrees of image sharpness. Whereas the prior art bilinear interpolation method relies upon dx and dy distances, the present invention instead replaces dx and dy with functions defined as NVx=F(dx) and NVy=F(dy), where F is user programmable, preferably by selecting coefficients. Upscaling according to the present invention can be carried out in a single dimension if desired.

Other features and advantages of the invention will appear from the following description in which the preferred embodiments have been set forth in detail, in conjunction with the accompanying drawings.

DETAILED DESCRIPTION OF THE PREFERRED EMBODIMENT

The present invention provides an algorithm that may be implemented in hardware and/or software to interpolate pixel positions using programmable coefficients, to accommodate different image types requiring different degrees of image sharpness.

As noted, the prior art bilinear interpolation method relies upon fixed normalized dx and dy distances and provides a fixed level of image sharpness that may suffice for some image types (e.g., moving images) but may not be sufficiently sharp for other image types (e.g., text). Instead of relying upon invariant normalized distances, the present invention replaces normalized dx and dy distances with functions defined as NVx=F(dx) and NVy=F(dy), where F is user programmable, preferably by selecting coefficients. If desired, the present invention may practiced in a single dimension, e.g., x or y.

The resultant upscaling algorithm represents an interpolation process that allows a user to select an arbitrary non-linear interpolation function by programming coefficients. The result is that the user can select an appropriate interpolation function for different types of images and thereby better control the degree of sharpness observed on the output image.

Instead of using dx, dy as the weights for P, PH, PV, PHV, two coefficients NVx, NVy are used to replace dx and dy.

NVx is a function of dx: NVx=F(dx). NVy is a function of dy: NVy=F(dy). F is programmable by selecting coefficients such that:

$$PO=(1-NVy)\cdot[(1-NVx)\cdot P+NVx\cdot PH]+NVy\cdot[(1-NVx)\cdot PV+NVx\cdot PHV]$$

Figure 1:
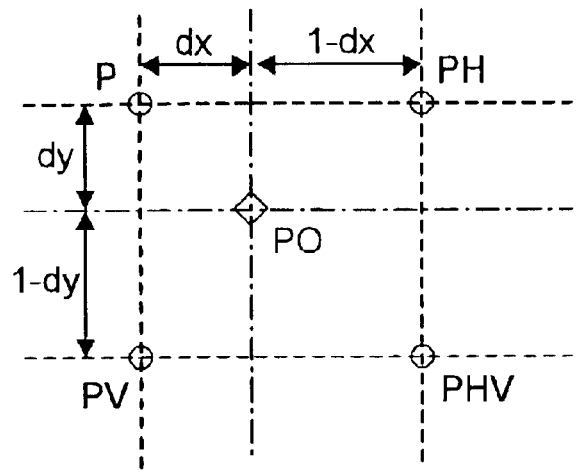
FIG. 1 depicts an output pixel and four neighboring pixels, as defined in bilinear interpolation, according to the prior art.
Figure 2A:
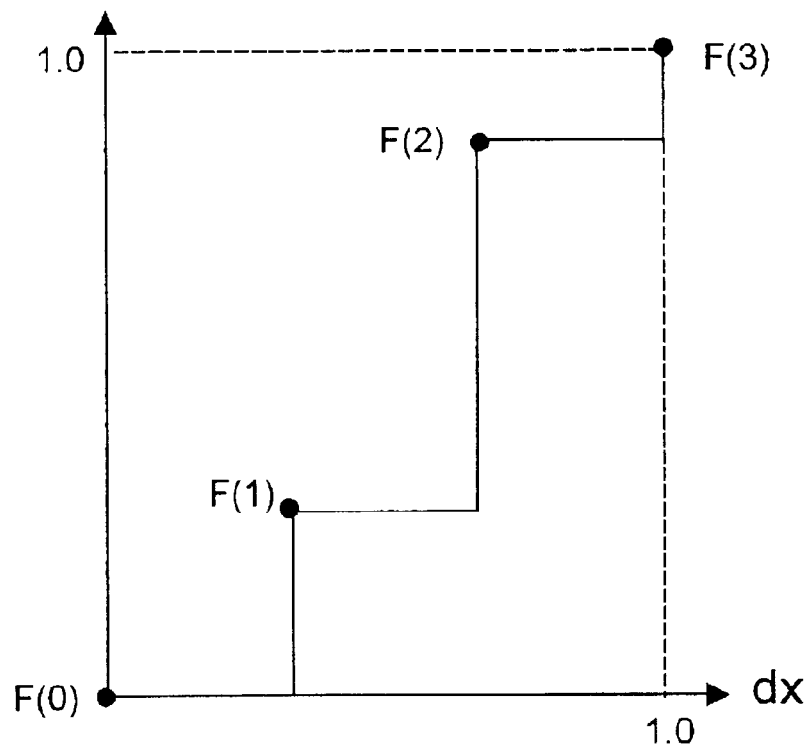
FIG. 2A and FIG. 2B depict exemplary graphs of dx vs NVx for discrete values of dx, according to the present invention.
Figure 2C:
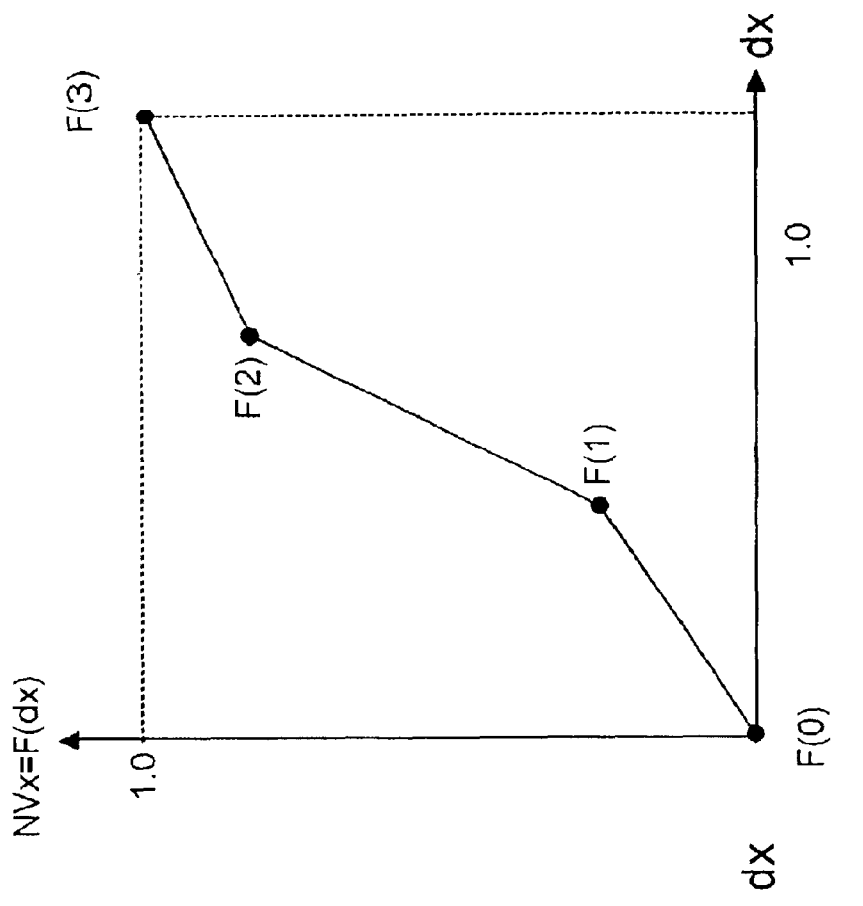
FIG. 2C depicts an exemplary graph of interpolated values of dx vs NVx, according to one embodiment of the present invention.
Figure 2B:
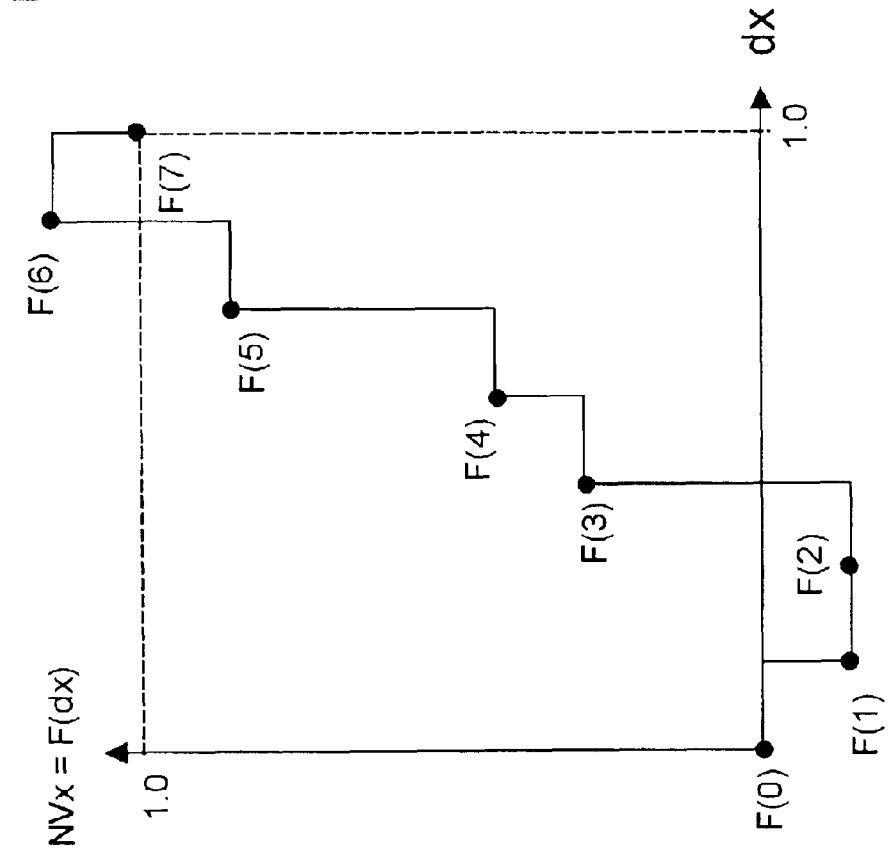

FIGS. 2A–2E depict exemplary graphs of NVx=F(dx) vs. dx, which graphs may be understood to also represent NVy=F(dy) vs dy. In FIGS. 2A and 2B, several discrete values of dx, denoted F(0), F(1), F(2), etc. are shown. Note in FIG. 2B that magnitude of NVx=F(dx) (or indeed NVy= F(dy)) may be greater than one or less than one, to enable over-emphasis in the scaling function, which can be a useful tool in some instances. It is understood of course that F(dx)=NVx may be designed with fewer or more discrete values than what is shown in FIGS. 2A and 2B, depending upon the granularity desired for the function. For example, in one embodiment, n=8 discrete values are provided.

Figure 2E:
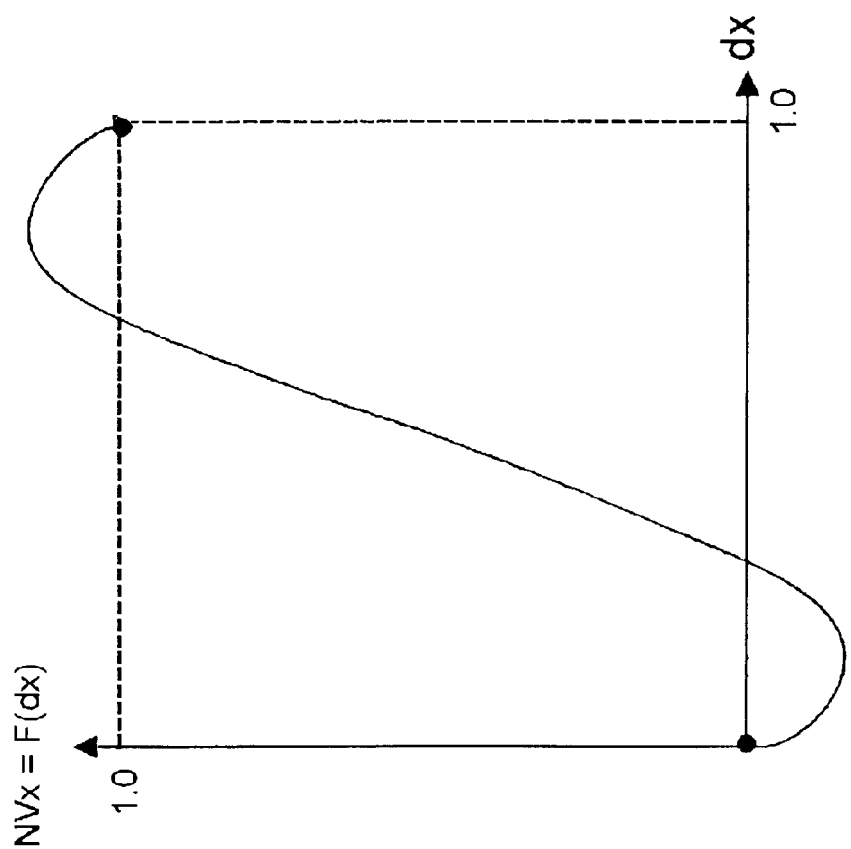
FIG. 2D and FIG. 2E depict exemplary graphs of ds vx. NVx for continuous values of dx, according to another embodiment of the present invention.
Figure 2D:
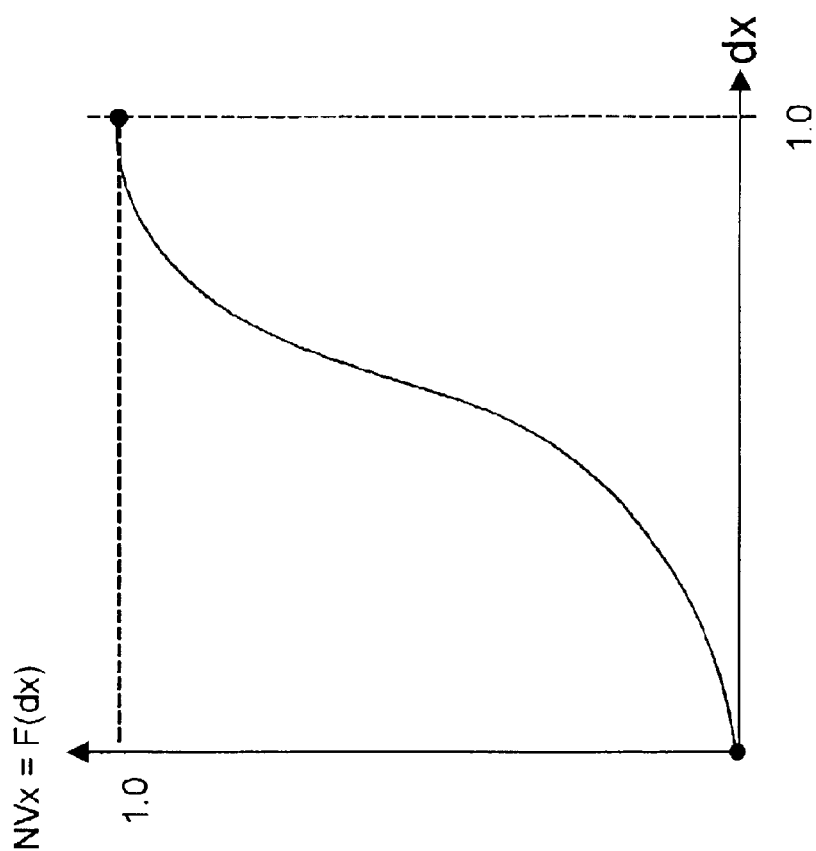

FIG. 2C depicts an exemplary graph in which interpolation between pixels occurs. In the system shown in FIG. 4, optional interpolation engine 240 would be included. FIGS. 2D and 2E depict continuous NVx (or NVy) functions present in a continuous system. Achieving continuous such functions would call for an analog look-up table (such as A-LUT 250 in FIG. 4).

In FIGS. 2A–2E, it will be appreciated that simply changing coefficients associated with different regions of the F(dx) (or F(dy)) function will change the shape of the resultant curve. If NVx=dx and NVy=dy, the resultant function will be bilinear in nature.

Figure 3A:
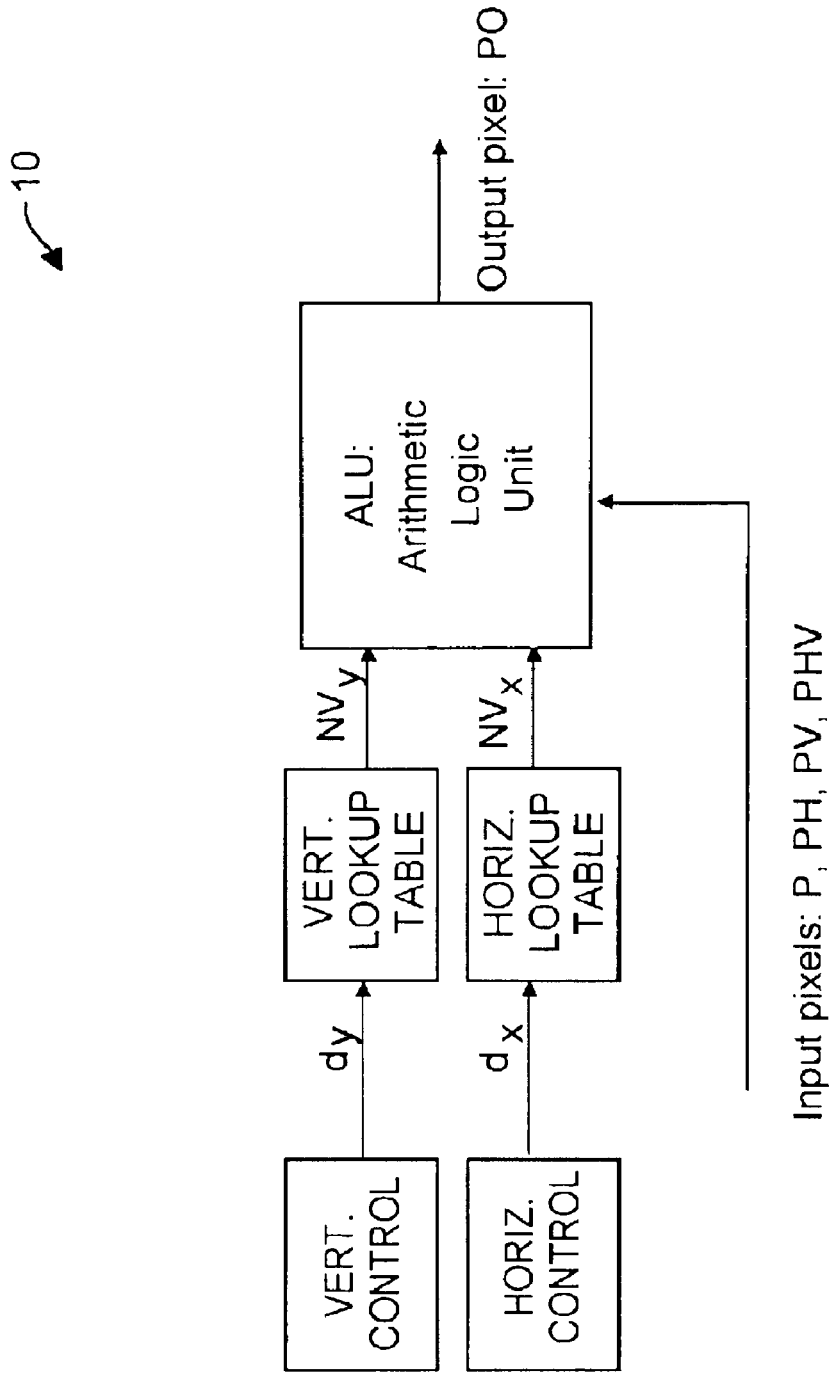
FIG. 3A depicts an exemplary architecture for implementing image upscaling, according to the present invention.

Referring now to the architecture shown in FIG. 3A, a system or sub-system 10, according to the present invention preferably includes a vertical control unit that calculates the vertical distance, dy, of each output pixel PO, and a horizontal control unit that calculates the horizontal distance, dx, of PO. A vertical look-up table preferably converts dy to NVy, and a horizontal look-up table preferably converts dx to NVx. Other conversion techniques and systems could of course be used. An ALU (arithmetic logic unit) is coupled to receive values for amplitudes of pixels NVx, NVy, P, PH, PV, PHV, and calculates the value of PO. A user can program either or both look-up tables to generate different PO values, and thus alter the image quality of the output from sub-system 10.

Figure 3B:
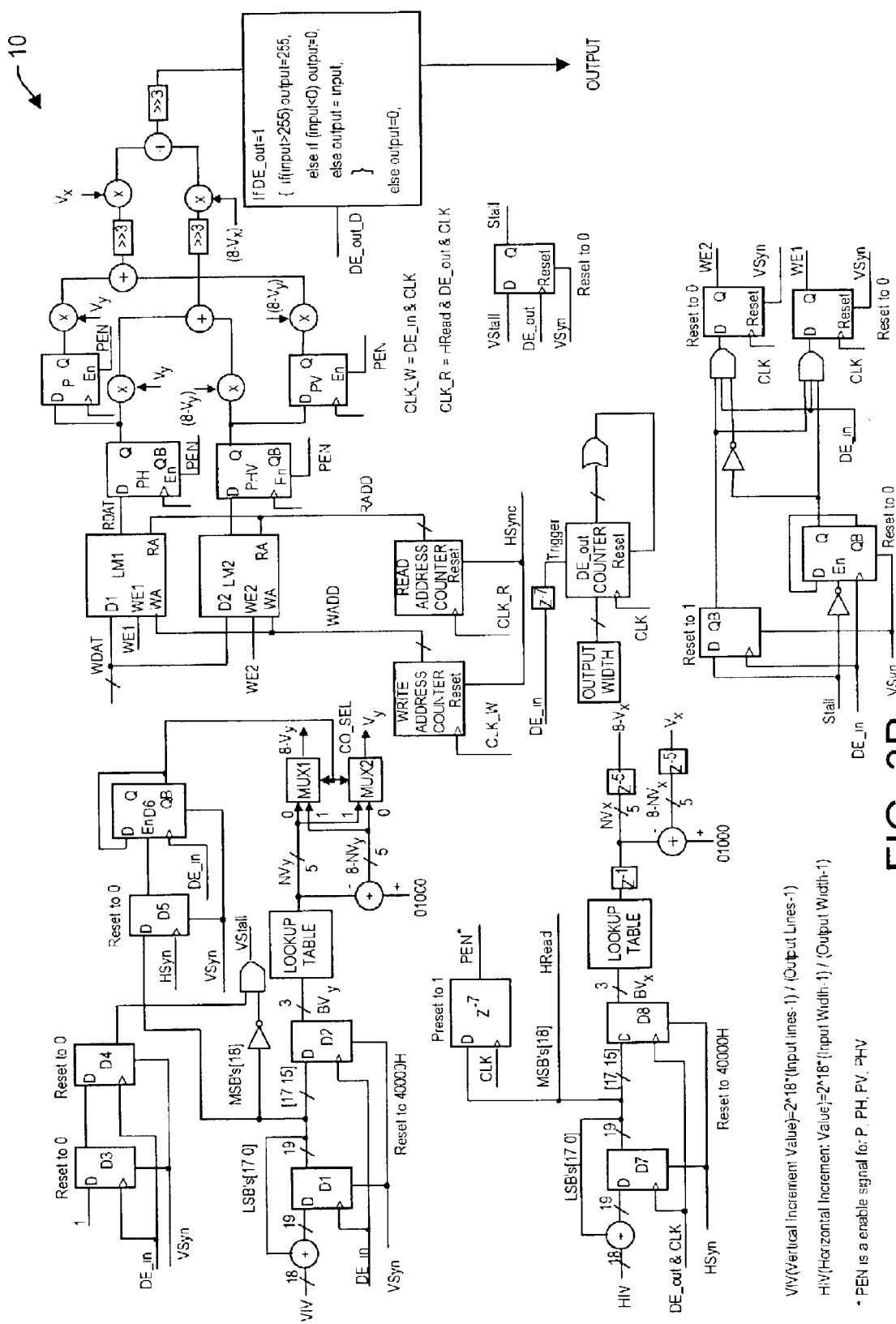
FIG. 3B depicts an exemplary system for executing an algorithm implementing the programmable image scaling architecture of FIG. 3A, according to the present invention.

FIG. 3B is a somewhat detailed schematic block diagram of an exemplary implementation of the exemplary architecture shown in FIG. 3A. In FIG. 3B, flip-flops D1 through D6 and their associated logic, and lookup table comprise the vertical control block. VIV is an increment value that defines resolution of the image scaler vertical calculation. VIV preferably is set by the ratio of the vertical resolution of the output display panel to the vertical resolution of the input image.

Flip flops D7 and D8 and their associated logic and lookup table comprise the horizontal control block. HIV is an increment value that defines resolution of the scaler horizontal calculation. HIV is preferably set by the ratio of the horizontal resolution of the output display panel to the horizontal resolution of the input image.

DE_in is a signal that defines start of active video for the input data. In the embodiment shown, DE_in is asserted high at the beginning of active data for each line of input data and goes low at the end of active video for each line of input data.

DE_out is a signal that defines the start of active video for the output data. In the embodiment shown, DE_out is asserted high at the beginning of active data for each line of output data and goes low at the end of active video for each line of output data. Stall is a signal that preferably is periodically sent to the graphics controller to halt transmission of one line of active video data. WDAT represents the input data and comprises a 24-bit bus (3 set of 8 bits for the colors RED, GREEN and BLUE). Those skilled in the relevant art will appreciate that in FIG. 3B, the notation ">>3" denotes a divide-by-eight operation, e.g., right-shift three places.

While FIG. 3B shows a specific hardware-oriented implementation, it is understood that the present invention may in fact be implemented using hardware and/or software other than what is described herein.

Figure 4:
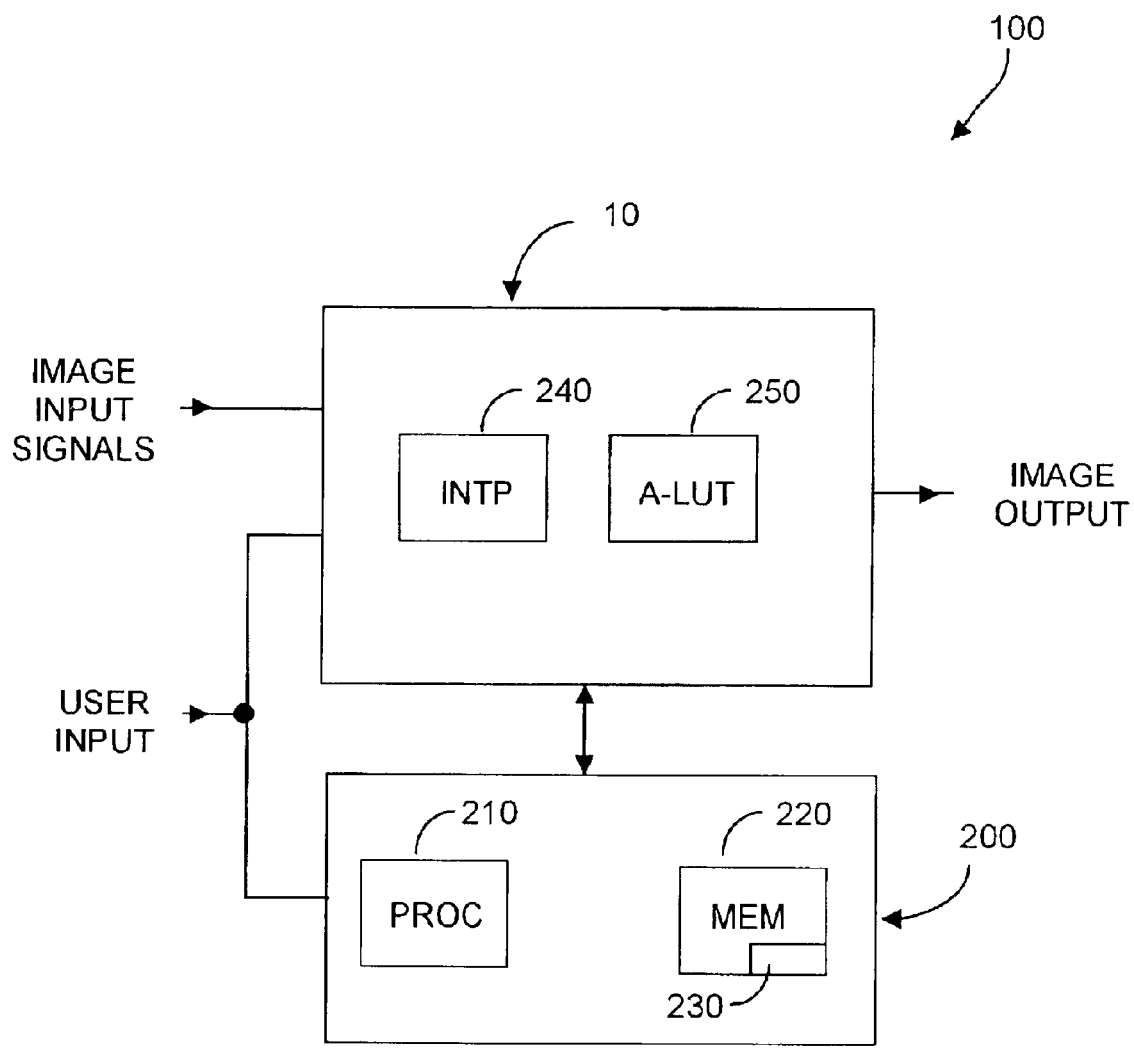
FIG. 4 depicts a system incorporating programmable image scaling, according to the present invention.

FIG. 4 depicts an overall system 100 that includes sub-system 10 and preferably a computer system 200 that includes at least a processor unit 210 and memory 220. Memory 220 may include read only memory (ROM), volatile memory (RAM), and non-volatile memory such as a magnetic storage, optical storage, flash storage, etc. Memory 220 preferably includes a software routine 230 that when executed by processor unit 210 will carry-out a software-based (rather than hardware based, as shown in FIGS. 3A and 3B) version of the present invention. It is understood that routine 230 may be stored in memory 220 or may be loadable into memory 230, e.g., from a CD or other removable storage element that includes the routine. Optionally subsystem 10 includes an interpolation engine 240 for embodiments in which interpolated functions such as shown in FIG. 2C are desired. Further, subsystem 10 optional includes an analog look-up table (A-LUT) 250 for use in continuous systems, whose functions are exemplified by FIGS. 2D and 2E.

Referring to FIG. 4, a user can input information to system 100 that will cause routine 230 to assign algorithm function coefficients appropriate to the nature and quality of the image input signals that are input to sub-system 10. As noted, the exemplary embodiment of FIG. 3 for sub-system 10 provides n=8 discrete levels of co-efficient for NVx and/or NVy, although of course fewer or more discrete co-efficient values may be used. System 100 will output video whose pixel resolution has been upscaled, for use by other systems, for example a video display monitor, a graphics routine, perhaps an HTML type document for viewing over the Internet or other network with an appropriate browser. Again it is noted that the various embodiments of the present invention may be used to implement a one-dimensional upscaling function (x or y), rather than the two-dimensional (x,y) functionality that has been described.

Modifications and variations may be made to the disclosed embodiments without departing from the subject and spirit of the invention as defined by the following claims.

What is claimed is:

1. A system to receive input image (x,y) data representable with a first pixel resolution and to output image data at a higher second pixel resolution, the system comprising:

given amplitudes of four pixels (P, PH, PV, PHV) at said first pixel resolution, means for defining, in at least one dimension selected from x and y, from said amplitudes amplitude of an intermediate pixel $$PO=(1-NVy)\cdot[(1-NVx)\cdot P+NVx\cdot PH]+NVy\cdot[(1-NVx)\cdot PV+NVx\cdot PHV]$$

at said higher second pixel resolution, where NVx=F(dx), NVy=F(dy), where F(dx) and F(dy) are functions of pixel distance, where distances from P to PH, from P to PV, from PH to PHV, and from PV to PHV are normalized to one, and normalized distances from P to PO are given as dx,dy; and means for outputting pixel amplitude including intermediate pixel amplitude and location at said higher second pixel resolution in at least one dimension selected from x and y.

2. The system of claim 1, wherein at least one of F(dx) and F(dy) are programmable coefficients.

3. The system of claim 1, wherein at least one of F(dx) and F(dy) are user-programmable coefficients.

4. The system of claim 1, wherein at least one of F(dx) and F(dy) are non-linear interpolation functions.

5. The system of claim 1, wherein at least one of F(dx) and F(dy) are non-linear interpolation functions having at least two break-points.

6. The system of claim 1, wherein at least one of F(dx) and F(dy) is a continuous function.

7. The system of claim 1, wherein at least one of F(dx) and F(dy) have at least eight discrete values.

8. The system of claim 1, wherein NVx=dx and NVy=dy.

9. The system of claim 1, including:
   a horizontal control unit to calculate distance dx of each output pixel PO; and
   a horizontal look-up table to convert dx to NVx.

10. The system of claim 9, wherein said horizontal look-up table is programmable.

11. The system of claim 1, including:
    a vertical control unit to calculate distance dy of each output pixel PO; and
    a vertical look-up table to convert dx to NVy.

12. The system of claim 11, wherein said vertical look-up table is programmable.

13. A computer readable medium storing a routine that when executed by a central processor unit carries out the following steps:
    (a) receiving amplitudes of four pixels (P, PH, PV, PHV) at a first pixel resolution;
    (b) in at least one dimension selected from x and y, determining from said amplitudes received at step (a) an amplitude of an intermediate pixel PO=(1−NVy)·[(1−NVx)·P+NVx·PH]+NVy·[(1−NVx)·PV+NVx·PHV] at said higher second pixel resolution, where NVx=F(dx), NVy=F(dy), where F(dx) and F(dy) are functions of pixel distance, where distances from P to PH, from P to PV, from PH to PHV, and from PV to PHV are normalized to one, and normalized distances from P to PO are given as dx,dy; and
    (c) outputting pixel amplitude including intermediate pixel amplitude and location at said higher second pixel resolution in at least one dimension selected from x and y.

14. The computer readable medium of claim 13, wherein at least one of functions F(dx) and F(dy) have at least one characteristic selected from a group consisting of (I) the function represents a programmable coefficient, (ii) the function represents a user-programmable co-efficient, (iii) the function is a non-linear interpolation function, (iv) the function has at least two break-points, (v) the function has at least eight break-points, and (vi) the function is continuous.

15. A method to receive input image (x,y) data representable with a first pixel resolution and to output image data at a higher second pixel resolution, the method including the following steps:
    (a) receiving amplitudes of four pixels (P, PH, PV, PHV) at a first pixel resolution;
    (b) in at least one dimension selected from x and y, determining from said amplitudes received at step (a) an amplitude of an intermediate pixel PO=(1−NVy)·[(1−NVx)·P+NVx·PH]+NVy·[(1−NVx)·PV+NVx·PHV] at said higher second pixel resolution, where NVx=F(dx), NVy=F(dy), where F(dx) and F(dy) are functions of pixel distance, where distances from P to PH, from P to PV, from PH to PHV, and from PV to PHV are normalized to one, and normalized distances from P to PO are given as dx,dy; and
    (c) outputting image (x,y) data, including intermediate pixel locations PO, at said higher second pixel resolution.

16. The method of claim 15, wherein at least one of functions F(dx) and F(dy) have at least one characteristic selected from a group consisting of (I) the function represents a programmable coefficient, (ii) the function represents a user-programmable co-efficient, (iii) the function is a non-linear interpolation function, (iv) the function has at least two break-points, (v) the function has at least eight break-points, and (vi) the function is continuous.

17. The method of claim 15, wherein NVx=dx and NVy=dy.

18. The method of claim 15, wherein step (b) is carried out at least in part in software.

19. The method of claim 15, wherein step (b) is carried out at least in part in hardware.

20. The method of claim 15, wherein said method is carried out under control of a central processor unit.

* * * * *